March 4, 1952          J. RUZE          2,587,653
ANGLE COMPARATOR
Filed Feb. 12, 1943
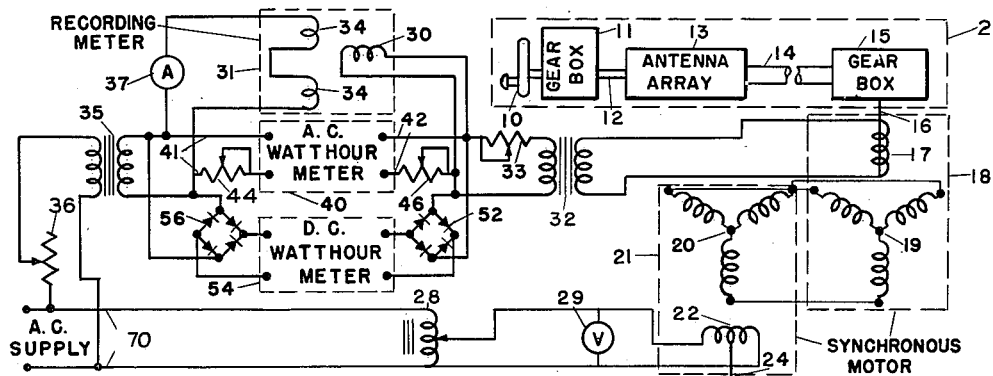
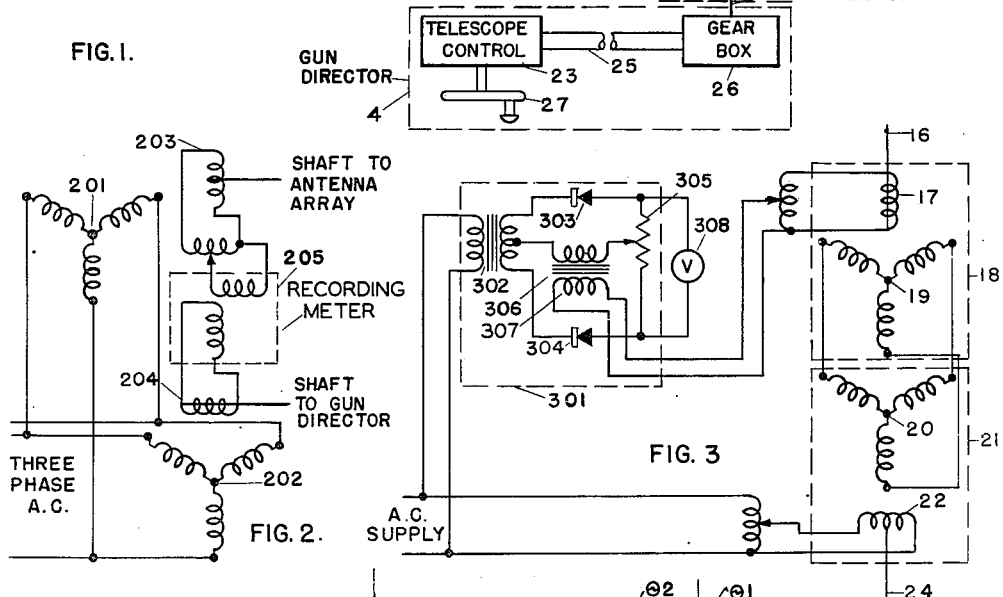
INVENTOR
JOHN RUZE
BY William D. Hall
ATTORNEY Patented Mar. 4, 1952

2,587,653

UNITED STATES PATENT OFFICE 2,587,653

ANGLE COMPARATOR

John Ruze, Asbury Park, N. J.

Application February 12, 1943, Serial No. 475,680

3 Claims. (Cl. 343—5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an electric error recording system, and particularly to an electric apparatus for continuous recording of a difference in angular position of a plurality of mechanical elements.

The system will be described by way of an example in connection with a radio object-locating system and gun director, but it is obvious that its teachings are applicable in any other field where it is desirable to compare angular positions of two or a larger number of mechanical elements regardless of the separation therebetween.

The radio object-locating system, which is considered by way of example, in connection with the description of my error-recording system, periodically transmits a signal of ultra-high frequency of short duration. A portion of this signal is reflected by any object in range which is capable of reflecting it. The returning signal is picked up by the receiving apparatus of the unit, and some visual tracking indicator method permits an antenna system to be rotated vertically and horizontally until the object is located on the "line of sight" of the antenna. When the obtained information is used for pointing guns at a target, the data concerning the azimuth and elevation positions of the antenna array, which represent the azimuth and elevation positions of an object that is being tracked, are transmitted by means of synchronous repeaters to appropriate dials in a gun director where this information may be used for the eventual training of the optical system of the director on the target.

The final values, indicated by the gun director dials after direct sighting of the target through its optical system, provide the absolute values for determining the exact location of the object. It is to be understood that the values obtained with the gun director may be considered as absolute values, and free of any errors only so long as the optical system of the gun director is made to track faithfully a moving object, and there is a continuous direct sighting of the object through the optical system of the gun director.

The values derived by means of the radio object-locating system may differ from the above absolute values by fixed and variable errors. Fixed errors result from the mechanical and electrical misalignment of the radio locating system itself, the data transmission system, or both. Variable errors are caused by variable interference between direct echoes and echoes reflected from ground and other objects, and due to inability of the operators to remain exactly "on target" when the latter is a fast moving target.

The proposed method of measuring these errors consists in using the use of the optical tracking system on the gun director (since in the proposed method the object can be sighted directly through the optical system of the gun director) for determining the actual position of the object and for providing the previously mentioned absolute values, converting these values into a first set of electrical vectors, converting the angular position of the radar antenna into a second set of electrical vectors, and electrically comparing the two sets of vectors.

The gun director optical system consists of two cross-hair telescopes so mounted as to be simultaneously varied in azimuth and elevation, and a set of data transmitters which indicate the positions of the optical elements axes of the telescopes on a set of dials concentrically mounted with other dials connected to and positioned by the radio locating system through the synchronous repeaters. When the radio system and the gun director are used simultaneously to track a moving target, and the indications of the two systems are the same, the two sets of concentric dials revolve at exactly the same speed and there is no relative displacement between the respective two dials. However, when the two respective dial speeds become different, because of the error in tracking of one of the two systems, there is an immediate displacement of the inner disc-shape dial with respect to the outer concentrically mounted ring-shaped dial. This displacement represents a discrepancy between the indications of the radio system and the absolute optical system of the gun director, and—as long as the optical system is properly tracking the moving object—the discrepancy in the position of the dials is chargeable to the radio system, and represents an error in tracking of the target by the radio system.

Another one of the features of this invention resides in the method of and apparatus for providing a continuous record of the above error.

In making a study of the performance of the radio object-locating system, the invention provides a continuous record of the error produced by the radio system. One method of compiling this error data, according to the prior methods, consisted of estimating the difference between the two dial readings at various intervals. These intervals, however, cannot be made rapid enough to give a true and continuous indication of the error. Moreover, there is an error introduced by the operator due to the difficulty of reading simultaneously two dials in continuous motion. The operator is more likely to report 5 and 10 mil errors when the actual indications are perhaps 2 and 7 mils. (1 mil is equal to $^{360}/_{6400}$ of one degree). This personal error increases in prominence as the tracking speed increases, and, also, as the equipment error decreases. Consequently, improving the accuracy of the radio object-locating equipment has little effect on the error as determined in this manner. These difficulties may be overcome by photographing the dials in question at one second intervals, but the tabulation and calculation of these results involves such labor as to make the method impractical. From the above considerations it will be understood that testing of the object-locating systems would be considerably advanced if the method of obtaining a record of the tracking error were made to resolve itself into a continuous and automatic recording of this error.

It is, therefore, an object of this invention to provide an electrical apparatus for continuous recording of a difference in angular positions between two or more mechanical elements.

Another object of this invention is to provide an error recording system where one of the above-mentioned mechanical elements is a radio object-locating system and the other element is a gun director and its optical system.

Still another object of this invention is to provide an error recorder, or a comparator system, which is capable of determining a fixed error and an average error in the angular position of one mechanical element, with respect to the other mechanical element, one of said elements acting as a source of absolute data.

In accordance with one embodiment of this invention, the angular position of two mechanical elements is compared by interconnecting these elements through two synchronous motors. The rotors of both motors are mechanically driven by the mechanical elements which are directly coupled to their respective rotors. The three-phase stators are connected together electrically. One of the rotors is electrically connected to a source of alternating current, while the other rotor is electrically connected to one coil of a two-coil meter, such as a wattmeter, the other coil of which is connected to that source of alternating current which is used for exciting one of the rotors. Electromagnetic flux produced by the rotor connected to the source of alternating current is used to transfer electrically the angular position of this rotor to the second motor where the magnitude and the phase of the voltage induced in the second rotor corresponds to the relative angular relationship between the two rotors. This variable phase and magnitude voltage is used in connection with the previously mentioned meter for indicating the angular relationship between the gun director and the radar antenna.

In accordance with another embodiment of my invention two multi-phase stators are connected to the same source of multi-phase alternating current, and a meter is connected between the two rotors, one of the rotors being mechanically connected to the gun director, and the other to the radio antenna system.

Still another embodiment of my invention illustrates how a two-coil meter may be replaced with a single-coil meter connected to a phase-differentiating network.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which:

Figure 1 is a schematic diagram of an error recorder in which single-phase rotors are each connected to a shaft, with one rotor connected to a source of alternating current, the three-phase stators are connected to each other and a conventional alternating-current recording wattmeter is used for indicating the degree and direction of angular displacements between the two shafts;

Figure 2 is a schematic diagram of an error recorder with three-phase stators connected to a source of three-phase power, and an alternating-current recording wattmeter connected to the rotors for automatically recording the tracking error;

Figure 3 is a schematic diagram of an error-recording circuit adapted for use with a direct-current recording voltmeter;

Figure 4 illustrates a typical error graph; and

Figures 5 and 6 illustrate flux and voltage relationships in a single-phase rotor connected to a meter circuit.

Referring to Figure 1, an antenna array 13 of a radio object-locating system 2, is connected through a shaft 16 to a synchronous motor 18. A gun director 4 is connected through a shaft 24 to the other synchronous motor 21. When rotors 17 and 22 of these motors have identical angular positions with respect to their stators 19 and 20, no voltage is induced in rotor 17, and a recording meter 31 reads zero. However, when there is an angular displacement between the rotors, there is a voltage induced in rotor 17, and this voltage is recorded by a recording meter 31 in a form of a chart illustrated in Fig. 4. The chart illustrates a tracking error in mils either for an azimuth or an elevation antenna, depending upon whether antenna 13, Fig. 1, is the elevation or the azimuth antenna. As the two error recording systems are identical for the two antennae, only one is illustrated in Fig. 1.

Referring now to Fig. 1 and radar components 2 more in detail, a hand-wheel 10 is connected to a gear box 11 which in turn is connected by a shaft 12 to antenna array 13 of the radio object-locating system. The antenna array is used to track echo-producing objects in a well known manner which need not be described in this specification. Suffice it to say that an operator of the radio system, by observing the magnitudes of the images produced by the echo signals on an oscilloscope screen, can direct the antenna array by turning wheel 10 until the observed images on the oscilloscope screen indicate that the antenna array is pointed directly at the echo-producing object. Antenna 13 is connected through an antenna supporting shaft 14 to a gear box 15, which in turn is mechanically connected to a single-phase rotor 17 of the antenna synchronous motor 18. Three-phase stator winding 19 of the antenna motor 18 is electrically connected to the three-phase stator winding 20 of a synchronous motor 21 whose single-phase rotor 22 is mechanically connected to a telescope positioning control 23 in the gun director 4 by means of shafts 24—25 and a gear box 26. A telescope positioning wheel 27 is controlled by an operator of the gun director who uses it for tracking a moving target by direct sighting of the target through the telescope of the gun director. The synchronous motor 21, which is mechanically coupled to the gun director and is thus a source of absolute data, has its rotor winding 22 connected to a source of alternating-current at terminals 70 through an auto-transformer 28. The output voltage of the latter may be controlled by observing the reading on a voltmeter 29 connected across the output terminals of the transformer. Rotor 17 is electrically connected to a voltage coil 30 of a zero center, recording, electrodynamometer type wattmeter 31 through a step-up transformer 32 and a variable resistance 33 in the secondary circuit of this transformer. The current coils 34 of the recording wattmeter are connected to the alternating-current supply 70 through a step-down transformer 35 a resistor 36, the latter being connected in series with the primary winding of this transformer. The current supplied to the current coils 34 of the wattmeter is indicated by an ammeter 37. Wattmeter 31 may be substituted by a synchroscope, which is a modified electrodynamometer wattmeter.

Since rotor 22 is mechanically connected to the source of absolute mechanical data, it will be referred to in this specification as the "absolute data rotor." Rotor 17 will be referred to as the "meter rotor," since it is electrically connected to the meter circuit.

In operation, the radio object locator, and the optical system of the gun director, are independently trained on the moving object being tracked by their respective operators, and the movements of antenna array 13 and of the telescope positioning control 23 are mechanically amplified through gear boxes 15 and 26. This amplified rotational movement of the two systems is applied independently to the rotors of the antenna and the gun director synchronous motors. The gear ratios of the two systems are equal so that when there is no error produced by either of the two operators in tracking the moving object, the angular displacements of the rotors are equal. Therefore, if the two systems are properly aligned before embarking upon the tracking experiment, no voltages will be induced in the meter rotor 17, since its displacements will be in strict synchronism, and in phase, with the displacements of the absolute data rotor 22. That this is so will become apparent upon a closer examination of the connections illustrated in Fig. 1. Alternating-current voltage is supplied to the absolute data rotor 22 connected to the gun director as well as to the current coils 34 of recording wattmeter 31 through the previously described circuits. Currents are induced in the stator windings 20 by the absolute data rotor, and these induced currents are reproduced in the stator windings 19 of the meter motor 12.

When the two rotors are at right angles with respect to each other, no voltage is induced in the meter rotor, but, as the meter rotor passes from one side of the null position to the other, the direction of the induced voltage is reversed with respect to the main exciting voltage 70. Moreover, the magnitude of this induced voltage will increase with the increase in the angle of deflection of the meter rotor, this increase being proportional to the sine of the deflection angle if the magnetic flux produced by the meter stator is uniformly distributed, and is varying as a modified sine function if this flux is of non-uniformly distributed nature. Since the exciting voltage 70 is applied to the current coils of the wattmeter, and the voltage generated by the meter rotor is applied to the voltage coil of the same wattmeter, the voltage impressed on the voltage coil causes the indicator to move in one direction or the other, depending on the direction of flux produced by the voltage coil, thus indicating the direction as well as the magnitude of the error.

This is illustrated in Figures 5 and 6. In these figures the resultant instantaneous flux produced by stator 19, Fig. 1, is illustrated at 500. It will vary as illustrated at 501, and it will be in phase with the flux produced by rotor 22. When the plane of the rotor coil 17 is in line with this flux, no voltage is induced in the rotor coil 17, as illustrated at 502. When rotor coil 17 is turned in the direction of arrow 603, Fig. 6, the rotor voltage will reach maximum when it is at right angles to the flux axis, and will be again zero when the rotor coil is turned 180 degress. This is illustrated at 606. The same is true when rotor 17 is turned in the direction of arrow 605, but the induced voltage, as illustrated at 607, will be in phase opposition to the voltage 606. A typical plot obtained with the recording wattmeter is illustrated in Fig. 4. Since angles $\theta_1$ and $\theta_2$, Fig. 6, are ordinarily quite small, the meter has a substantially linear scale.

In analyzing the tracking error chart the following facts must be considered: The tracking error may have positive and negative values with respect to the zero error line. This is indicated on the zero-center scale meter by deviations to the left and to the right of normal zero position, and as plus and minus errors in Fig. 4. This total error, in the initial stages of adjustment of the system, is composed of two component errors: a fixed error due to a fixed misalignment of the radio system, and a variable error chargeable to the operators of the system. If all the areas subtended by the positive error curves shown in Fig. 4 are integrated and added together, and all the areas subtended by the negative error curves are also integrated and added together, and the total negative area is subtracted from the total positive area, the resulting difference, divided by the time element involved, will indicate a fixed error. In the above case it is assumed that the variable error cancels itself out by equalization of the positive and negative areas under the curve. This is ordinarily the case if an adequate length of time is allowed for the accumulation of the tracking error data, for the concomitant equalization of the variable error. This fixed error is due to incorrect orientation of the equipment. After its determination, the fixed error can be corrected, and completely eliminated by proper realignment of the radar equipment.

If, after elimination of the fixed error from the radar equipment, the system is operated again, and an error chart is obtained without any significant fixed error present in it any more, and all positive areas as well as the negative areas are integrated, added together without any regard to sign, and divided by the time element involved, then the results of this division will represent an average error. This error is important for it indicates the accuracy which can be obtained with any particular radio object-locating equipment, and it also gives a good indication of the actual operating results that may normally be expected with the system under test.

Since the fixed error represents the difference between the positive and negative errors, it can be obtained by connecting an induction-type watt-hour meter 40, Fig. 1, in parallel with wattmeter 31. Conductors 41 and a rheostat 44 are used to connect the current coils of the meter to a source of alternating current supply, while conductors 42 and a rheostat 46 are used to connect the voltage coil of the meter to rotor 17. The positive errors will be registered on the watthour meter as positive readings, and the negative errors will be subtracted by the watthour meter from the positive reading as negative power because of the reversal in rotation of the meter disc. The resultant watthour meter reading will correspond to the total fixed error in tracking multiplied by time. That this is so follows from the fact that when there is a positive error, voltage impressed on the voltage coil of meter 40 has a phase relationship as shown at 606 in Figure 6. When the error has a negative sign, there is a reversal in phase of voltage generated by the meter rotor, as shown at 607 in Figure 6. This phase reversal in the voltage impressed on the voltage coil of meter 40 will be registered on the watthour meter, in one case as a positive power, and in the other case this positive reading is reduced by the meter disc and the dials connected to it turning in the reversed direction. The final reading on the watthour meter will correspond to the total fixed error multiplied by the length of time during which the experiment was conducted. If the watthours thus obtained are divided by the time element, or by the hours, the watts obtained may be very readily converted into a fixed error in mils from the known calibration curve, such as that shown in Figure 4.

In order to obtain an average error it is necessary to integrate the negative components together with the positive components so that when the entire error is registered on the watthour meter, it appears as the sum total of the positive and negative areas shown in Figure 4. Since, as in the case of the fixed error determination, there is a reversal in phase of the voltage impressed on the voltage coil of the meter when the error changes its sign, this phase reversal being shown at 606—607 in Figure 6, if one is to obtain a reading on the watthour meter which would correspond to the summation of all the areas, this phase reversal must be eliminated before the voltage generated by meter rotor 17 is impressed on the watthour meter. This is shown in Figure 1. The voltage from meter rotor 17 is impressed on full wave rectifier 52, and the rectified voltage is impressed on one coil of direct-current watthour meter 54. The other coil of the meter is connected through full wave rectifier 56 to alternating-current supply as shown in Figure 1. In order to obtain the average error in mils, the direct-current watthour meter reading, as before, in the case of the alternating current watthour meter reading, is divided by time, and the results are converted into mils from the calibration curve shown in Figure 4. This reading in mils represents the average error which is a combination of the tracking or ranging errors committed by the operators as well as the errors which are chargeable to the radio system itself.

In calibrating the instrument, the radio object-locating system and the optical system of the gun director are trained on a distant reflection object in line with both systems. The alignment of the rotors is so adjusted as to give a zero meter reading. The optical system is then thrown several mils out of alignment, and the auto-transformer 28 and variable resistances 33 and 33 are so adjusted as to produce a suitable scale deflection on the meter. The instrument is then ready for use as indicated above.

The results of Fig. 1 may be obtained with the three-phase stators connected to a three-phase supply, and with the meter circuit connected between the single-phase rotors. This is shown in Fig. 2. As the action of this system is similar to that of Fig. 1, it needs only a brief description. A source of three-phase alternating current is connected to three-phase stators 201 and 202. These stators produce two synchronously rotating fields. When the single-phase rotors 203 and 204 occupy identical positions with respect to their synchronously revolving fields, the alternating-current voltages induced in the field windings are equal and in phase with each other. However, if there is an angular displacement between the two rotors, there will be a phase displacement between the two voltages induced in the rotors, and this relative phase displacement between the two voltages, rather than the variations in the magnitude and the phase reversal relief upon in connection with Fig. 1, may be used for indicating the angular position of the rotors. Accordingly, if this system is to read zero when rotors 203—204 are connected to a single-phase dynamometer type wattmeter shown at 205, the rotors should be at right angles. This will make the power factor between the current in the current coil and current in the voltage coil of the wattmeter equal to zero. If the wattmeter is replaced by a synchroscope, the rotors should normally occupy identical positions with respect to their stators, since a synchroscope reads zero when the two sources of voltage are in phase.

Fig. 3 illustrates a modification of my system where recording of the tracking error is made by means of a recording voltmeter. Since the motor, as well as the mechanical connections, are the same in Figs. 1 and 3, they need no additional description. The identical elements bear the same numerals in both figures. As in the case of Fig. 1, any misalignment of the rotors in Fig. 3 induces a voltage in the meter rotor, the magnitude and the direction of this voltage following the phase position of the meter rotor, as illustrated in Figs. 5 and 6. If one were to connect an alternating-current voltmeter directly to the output of the receiving rotor, its reading would indicate the magnitude of the tracking error only. To indicate the direction as well as the magnitude of the error, a phase-comparing circuit may be inserted between the meter rotor and the direct-current voltmeter. Such a circuit is indicated at 301. Since phase-comparing circuits of this type are known, a brief description will suffice. It comprises a transformer 302 with a centrally tapped secondary, the outer terminals of which are connected to rectifiers 303—304 and an output resistance 305. The center tap of the secondary is connected to the center tap of resistance 305, through the secondary of a transformer 306, the primary 307 of which is connected either directly or through an appropriate step-up transformer and a potentiometer to the rotor 17. The primary of transformer 302 is connected to the same alternating-current supply which is used for the excitation of the absolute data rotor. Direct-current voltmeter 308, which may be of the recording type, is connected across resistance 305. When no voltage is induced in the meter rotor, no voltage is impressed on primary 307. The only voltage that is impressed on the phase-comparing circuit at this time is that which is induced in the secondary of transformer 302. This voltage will impress on voltmeter 308 an alternating-current voltage of constant amplitude, and, since voltmeter 308 is of the direct-current type, it will normally read zero. If the meter rotor leaves the null point, an alternating-current voltage will be induced in the meter rotor, and it will be impressed on the primary 307. This alternating-current voltage will be rectified by rectifiers 303—304, and, if it is not opposed at this instant by the voltages produced by transformer 302, it will produce pulsating unidirectional voltages in the parallel branches of the phase-comparing circuit composed of the rectifiers 303 and 304. This voltage, by itself, has no effect on the voltmeter. Since the pulsating direct-current voltage produced by transformer 306 is in phase with the alternating-current voltage produced by transformer 302, it reinforces a positive or negative half-cycle produced by transformer 302, depending upon whether it has the phase shown at 606 or 607, Figure 6. This results in the constant preferential reinforcement of either one or the other half-cycle of the voltage impressed on meter 308. Since the cycles of the voltage impressed on voltmeter 308 are no longer equal, the voltmeter will respond to this unbalanced condition, and will indicate the average magnitude of the existing voltage unbalance. One thus obtains an error indication on the direct-current voltmeter, which will register the direction as well as the magnitude of the error.

The above method of producing continuous record of the tracking error has been illustrated in connection with one antenna array. However, when it is necessary to produce a multiplicity of the error records, as is usually the case, the combination of synchronous motors described above, may be multiplied by multiplying the equipment shown in Figure 1.

The advantages of my invention may be summarized here briefly as follows: the method enables one to use the optical system of the gun director as a source of absolute data, a completely independent operation of the gun director and of the radio system by their respective operators is made possible, and a continuous automatic record of the tracking errors is obtained. Moreover, besides obtaining the continuous chart of the tracking error, the method provides means for determining the fixed error and the average error, the determination and the separation of which is absolutely essential if one is to obtain the utmost accuracy with the radio object-locating system.

The precision of the method of comparing the angular position of two mechanical elements is limited substantially by the precision of the meter used, and is, as a rule, higher than the precision of any other part of the system.

Although I have illustrated preferred forms for carrying out my present invention, it is to be understood that modifications are feasible, and I do not intend to be limited except as set forth in the appended claims.

What I claim is:

1. In a system for producing a continuous record of the tracking error of a radio object-locating system, a first synchronous motor having a first stator and a first rotor, a gun director having an optical system to provide absolute tracking data, said optical system being mechanically connected to said first rotor a second synchronous motor having a second stator and a second rotor, an antenna electrically connected to said radio system, and mechanically connected to said second rotor, a source of alternating current connected to said first rotor, electrical connections between said stators whereby said first motor is capable of transferring electrically the angular position of said optical system to said second motor, and a multicoil meter having one of its coils connected to said second rotor, and the other coils to said source of alternating current, whereby said meter is capable of producing said continuous record of said tracking error of said radio system.

2. In a system for electrically determining an integrated fixed error of a radio object-locating system subject to a total tracking error, a first synchronous motor having a first stator and a first rotor, a gun director having an optical system to provide absolute tracking data, said optical system being mechanically connected to said first rotor a second synchronous motor having a second stator and a second rotor, an antenna electrically connected to said radio system, and mechanically connected to said second rotor, a source of alternating current connected to said first rotor, electrical connections between said stators whereby said first motor is capable of transferring electrically the angular position of said optical system to said second motor, and an alternating-current wattmeter having one of its sides connected to said second rotor, and the other side to said source of alternating current, whereby said meter is capable of deriving said integrated fixed error by recording the difference between the integrated positive and negative values of said total tracking error over a measured interval of time.

3. In a system for electrically integrating an average error of a radio object-locating system, a first synchronous motor having a first stator and a first rotor, a gun director having an optical system to provide absolute tracking data, said optical system being mechanically connected to said first rotor, a second synchronous motor having a second stator and a second rotor, an antenna electrically connected to said radio system and mechanically connected to said second rotor, a source of alternating current connected to said first rotor, electrical connections between said stators whereby said first motor is capable of transferring electrically the angular position of said optical system to said second motor, a first rectifier connected to said source of alternating current, a second rectifier connected to said second rotor, and a direct-current watt-hour meter connected between said rectifiers whereby said meter is capable of integrating electrically the positive and negative values of said error in a process of integrating said average error.

JOHN RUZE.

REFERENCES CITED

The following references are of record in the file of this patent:

UNITED STATES PATENTS

| Number | Name | Date |
|---|---|---|
| 798,236 | Usener | Aug. 29, 1905 |
| 1,154,252 | Kennedy | Sept. 21, 1915 |
| 1,612,117 | Hewlett | Dec. 23, 1926 |
| 1,628,463 | Hewlett | May 10, 1927 |
| 1,890,891 | Vopel | Dec. 13, 1932 |

FOREIGN PATENTS

| Number | Country | Date |
|---|---|---|
| 672,531 | Germany | Mar. 4, 1939 |